(12) United States Patent
Dehn et al.

(10) Patent No.: US 6,981,532 B2
(45) Date of Patent: Jan. 3, 2006

(54) DRIP FEED APPARATUS FOR A FUEL CONTAINER

(75) Inventors: James J. Dehn, Brookfield, WI (US); Thomas G. Guntly, Hartford, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 10/209,687

(22) Filed: Aug. 1, 2002

(65) Prior Publication Data

US 2004/0020560 A1 Feb. 5, 2004

(51) Int. Cl.
*B67D 5/00* (2006.01)

(52) U.S. Cl. .................. 141/110; 141/100; 141/364; 222/187; 220/86.2; 123/1 A
(58) Field of Classification Search .............. 141/100, 141/110–112, 364, 375, 379; 220/86.2; 123/1 A; 222/187, 190
See application file for complete search history.

(56) References Cited

U.S. PATENT DOCUMENTS

| | | | |
|---|---|---|---|
| 2,955,028 A | | 10/1960 | Bevans |
| 4,024,991 A | * | 5/1977 | Tyson et al. ............. 222/190 |
| 4,214,615 A | | 7/1980 | Boyer |
| 4,596,277 A | | 6/1986 | Djordjevic |
| 4,971,118 A | | 11/1990 | Cluff |
| 5,004,025 A | | 4/1991 | Robbins |
| 5,059,217 A | | 10/1991 | Arroyo et al. |

(Continued)

FOREIGN PATENT DOCUMENTS

| | | |
|---|---|---|
| DE | 100 00 396 A | 7/2001 |
| JP | 07 224734 A | 8/1995 |

OTHER PUBLICATIONS

R.T. Vanderbilt Company, Inc., Vanlube PCX Specification sheet, Dec. 30, 1992, 1 page.
R.T. Vanderbilt Co., VANLUBE product information from web site, http://www.rtvanderbilt.com/petro_1.htm, printed Jul. 16, 2002.
Octel Starreon, LLC, DMA–H54 Material Safety Data Sheet, Revised Mar. 30, 2002, pp. 1–7.
Octel Starreon, LLC., Antioxidant No. 30 (AO–30) Material Safety Data Sheet, Revised Mar. 19, 2002, pp. 1–6.
Octel Starreon, LLC., DCI–6A Material Safety Data Sheet, revised Feb. 14, 2002, pp. 1–7.
Octel Starreon, LLC., DMD–2 Material Safety Data Sheet, revised Mar. 14, 2002, pp. 1–8.
Interface Solutions, Inc., Who we are, web site http://www.sealinfo.com/isiweb/website.nsf/CompanyInfoView/Who+We+Are?Open Document, printed Jul. 5, 2002, pp. 1–4.
Interface Solutions, Inc., M–5201 Hydro–Fused/Nonasbestos Gasket Material, ASTMF723133E22M6 Specification Sheet, Revised Dec. 5, 2001, pp. 1–2.
Pall Corporation, "Did You Know? Hydrophobic Membranes Are Used In Automotive Applications", website http://domino.pall.com/www/weblib.nsf/868B55BC1B1827BA852564BA00497918/BC2 . . . , printed Apr. 24, 2003.
Pall Specialty Materials, Product specification sheet for Supor® R Membrane, A FluoRepel™ Treated Membrane, and Appendix C—Basic Filtration Concepts, pp. 84–86, received Apr. 24, 2003.

*Primary Examiner*—J. Casimer Jacyna
(74) *Attorney, Agent, or Firm*—Michael Best & Friedrich, LLP

(57) ABSTRACT

The invention recites an apparatus that delivers a fuel additive to a fuel container. The apparatus includes a housing that defines a fuel additive chamber. The housing is interconnectable with the container and the housing has a release section that automatically releases a portion of the fuel additive from the chamber into the tank.

46 Claims, 7 Drawing Sheets

U.S. PATENT DOCUMENTS

| | | |
|---|---|---|
| 5,249,552 A | 10/1993 | Brooks |
| 5,421,295 A | 6/1995 | Lemaire et al. |
| 5,456,217 A | 10/1995 | Thunker et al. |
| 5,573,557 A | 11/1996 | Thunker et al. |
| 5,580,359 A | 12/1996 | Wright |
| 5,662,799 A | 9/1997 | Hudgens et al. |
| 5,695,531 A | 12/1997 | Makino et al. |
| 5,735,320 A | 4/1998 | Tune et al. |
| 5,992,473 A | 11/1999 | Hammonds |
| 6,238,554 B1 | 5/2001 | Martin, Jr. et al. |
| 6,263,924 B1 * | 7/2001 | Grosser .................. 141/102 |
| 2001/0000400 A1 | 4/2001 | Stehouwer et al. |
| 2004/0026291 A1 | 2/2004 | Drozd et al. |

* cited by examiner

DRIP FEED APPARATUS FOR A FUEL CONTAINER

BACKGROUND OF THE INVENTION

The present invention relates to fuel containers, and particularly to containers to which fuel additives are introduced.

Equipment employing an internal combustion engine, such as a lawnmower, includes a fuel system that supplies fuel to the engine. The system includes a tank, in which fuel is stored for use. Because the equipment is used intermittently, it is desirable to include a fuel additive in the fuel to protect the engine from damage. The additive may include a rust inhibitor, a de-moisturizer, a metal deactivator, an anti-oxidant, etc. Known additives include fuel stabilizers that are often mixed with the fuel in a storage container or added to the fuel tank before engine use.

Often fuel containers store large amounts of fuel for use in one or more pieces of equipment. These containers or tanks may hold fuel for long periods of time. During this time, contaminates (e.g., water, metals, dirt, etc.) can collect in the fuel. Therefore, it is desirable to add fuel additives to these tanks or containers.

Additives require precise mixing to reach their full effectiveness. Often this requires the user to mix the additive in a storage container or estimate the amount required in the fuel tank. These estimates result in inaccuracies in the mixture that can reduce the effectiveness of the additive or worse, can cause harm to the engine.

Furthermore, fuel degradation is known to be greatest when the fuel has been standing in a container after a period of inactivity. Therefore, an increase in the ratio of additive to fuel in the fuel container following a long idle period is desirable.

SUMMARY OF THE PREFERRED EMBODIMENT

The present invention provides an apparatus that delivers a fuel additive to a fuel container. The apparatus includes a housing that defines a fuel additive chamber. The housing is interconnectable with the container and the housing has a release section that automatically releases a portion of the fuel additive from the chamber into the tank, without human intervention or mechanical operation.

In preferred constructions, the housing at least partially defines a fuel container cap. A second housing supports the first housing and completes the cap. In addition, the first housing includes an aperture and/or a membrane that meters the release of additive such that a predetermined volume is delivered at a predetermined rate.

In another preferred construction, the housing itself defines a cap for a container or a gas tank. The housing includes a chamber and a delivery portion for delivering additive to the interior of the tank or container.

The housing, in preferred constructions, covers the fill opening of the container or tank. In other constructions, a separate opening supports the housing.

In another construction, the apparatus provides a cap that delivers a fuel additive to a fuel container. The cap includes a first housing that defines a fuel additive chamber. The housing has a release section that automatically releases a portion of the fuel additive from the chamber. The cap also includes a second housing selectively engagable with the container. The second housing supports the first housing to position the release portion of the first housing in fluid communication with the container to allow the portion of fuel additive released from the chamber to enter the fuel container.

In preferred constructions, the cap covers the opening in the container that is used to fill or empty the container. In other constructions, a separate opening within the container supports the cap.

BRIEF DESCRIPTION OF THE DRAWINGS

The detailed description particularly refers to the accompanying figures in which.

DETAILED DESCRIPTION OF THE DRAWINGS

Figure 1:
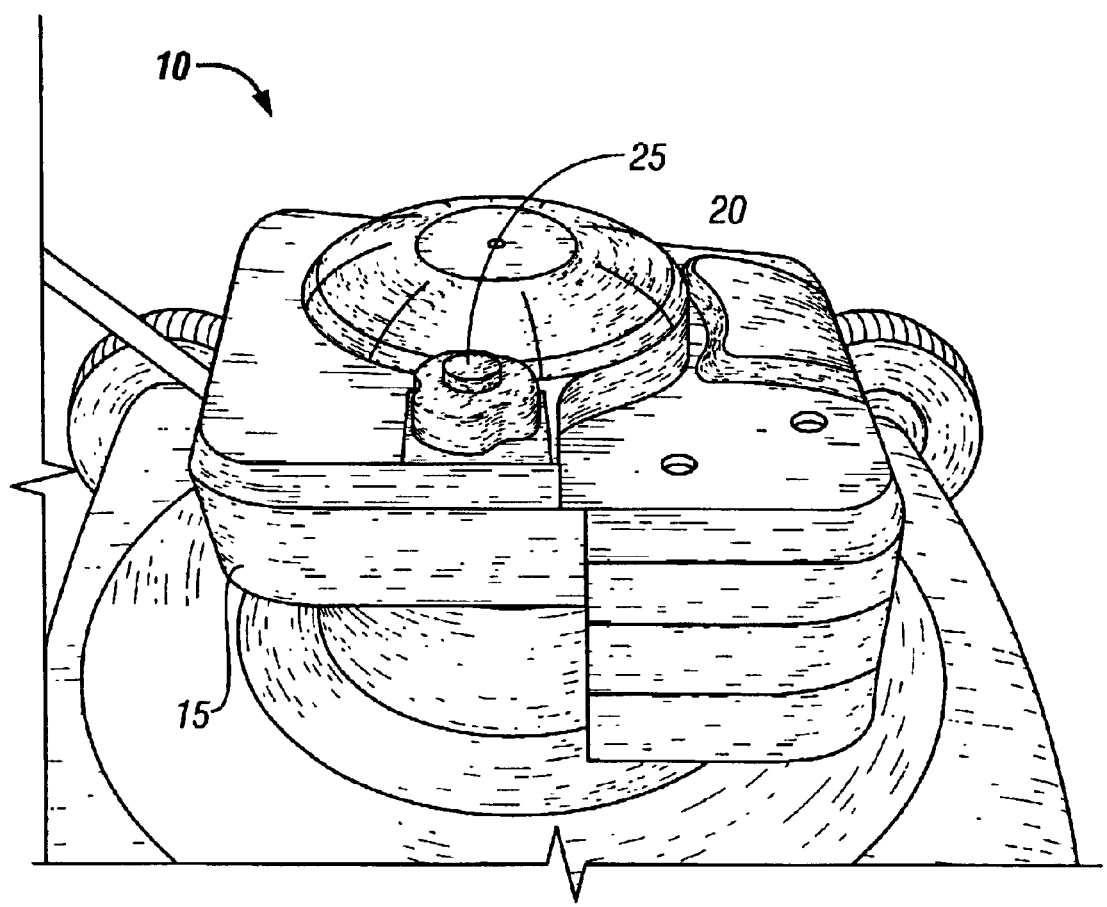
FIG. 1 is a perspective view of a portion of a lawnmower including a cap embodying the invention.

With reference to FIG. 1, a lawnmower 10 includes an engine having a fuel tank 15 and a cap 20. Included in the cap 20 is a drip feed apparatus 25 of the invention. While the invention is illustrated attached to a lawnmower engine, it should be understood that the invention will function with other internal combustion or diesel engines to provide an additive to the fuel. In addition, the invention will function with other types of fuel containers such as free-standing fuel tanks used in agriculture or construction to re-fuel equipment and portable fuel containers. Therefore, the invention should not be limited to lawnmower engines alone, nor should it be limited to engines having fuel tanks.

Figure 2:
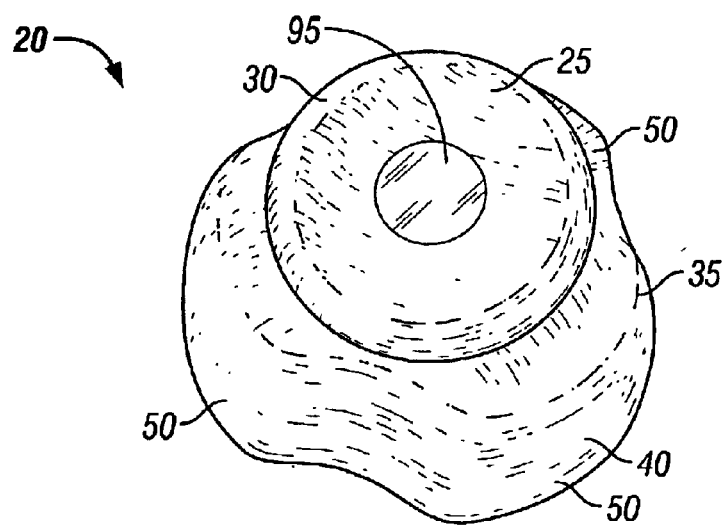
FIG. 2 is a perspective view of the cap shown in FIG. 1.
Figure 3:
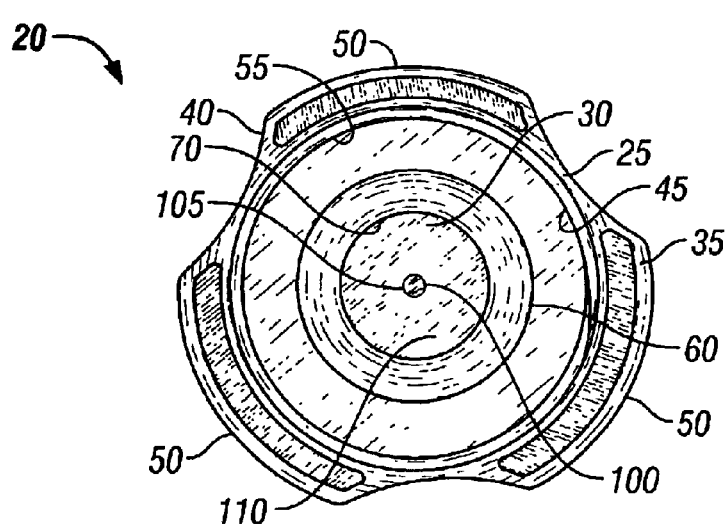
FIG. 3 is a bottom view of the cap shown in FIG. 1.
Figure 4:
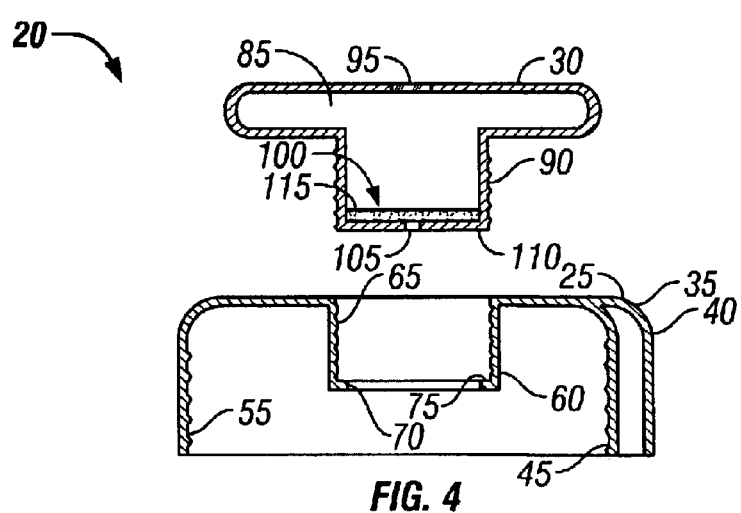
FIG. 4 is an exploded cross-sectional view of the cap of FIG. 1.

Turning to FIGS. 2–4, a construction of the fuel cap 20 includes a first housing such as a reservoir 30 and a second housing such as a cap shell 35. The cap shell 35 includes an outer surface 40 and an inner surface 45. The shape of the outer surface 40 of the cap shell defines a grip for the user. In the construction of FIGS. 2–4, the grip includes three lobes 50. However, other shapes will also function to define a grip for the user. For example, a four-lobed cap shell or vertical ribs provide satisfactory grips for the user and is contemplated by the invention.

The cap shell 35 further includes a first threaded portion 55 and a receptacle 60 for receiving the reservoir 30. The first threaded portion 55 provides a suitable engagement between the cap shell 35 and the opening of the fuel tank 15 or container to which it attaches. Other attachment methods (e.g., snap-fittings, cam-locks, etc.) will function with the invention.

The receptacle 60 projects toward the inner surface 45 of the shell 35 away from the outer surface 40 and includes a second threaded portion 65, an aperture 70, and a shoulder 75. The second threaded portion 65 includes threads that are sized to engage the reservoir 30. The large aperture 70 extends through the cap shell 35 and defines an opening between the exterior of the container and the interior of the container to which the shell 35 attaches. The shoulder 80 located adjacent the aperture 70 provides a stop for the reservoir 30 and allows the reservoir 30 to be fully inserted into the cap shell 35.

The reservoir 30, shown in section in FIG. 4, defines a chamber 85 in which a fuel additive can be stored for use. The reservoir 30 also includes a threaded portion 90, a window portion 95, and a release section 100.

The threaded portion 90 of the reservoir 30 is engagable with the second threaded portion 65 of the cap shell 35. When in the engaged position, the reservoir 30 closes the aperture opening between the container exterior and the container interior, thus defining a container cap 20. In the construction of FIGS. 2–4, the reservoir 30 in combination with the cap shell 35 defines a cap 20 capable of sealing a container or fuel tank 15.

The release section 100 includes an aperture 105, illustrated in the bottom surface 110 of the reservoir 30 in FIG. 4, that provides for a flow path out of the reservoir 30. It should be noted that some constructions do not include an aperture 105 but instead employ a reservoir 30 having a bottom surface 110 made of a permeable material (discussed below). The aperture size at least partially determines the rate at which additive is added to the fuel. For example, an aperture 105 may be sized to provide only one drop of fuel in a twenty-four hour period, while a larger aperture 105 may provide three drops. A smaller aperture 105 may provide only one drop of additive per week. The rate of flow is based on many variables (e.g., additive composition, fuel type, tank size, etc.) and should be determined individually for the desired application. It should be noted that the time period for delivery need not be precise. For example, a release section 100 that provides one drop of additive per day may actually deliver one drop on one day, no drops the second day, and two drops the third day. While the flow rate is given as one drop per day, it should be measured and averaged over a longer time period, perhaps a week (i.e., 7 drops in one week) or even a month (i.e., 30 drops in one month) to determine the actual flow rate.

To further control the flow rate out of the reservoir 30, the release section 100 of FIG. 4 includes a membrane 115 disposed within the reservoir 30. The membrane 115 is disposed between the fuel and the fuel additive so that the additive must pass through the membrane 115 to get to the fuel. The membrane 115 provides a permeable layer that allows the additive to pass at a predictable rate (e.g., 0.01–0.02 grams/day).

In addition to being permeable, the membrane 115 is preferably also resistive to gasoline vapor or any fuel vapor that it may be exposed. Furthermore, it is desirable that the membrane 115 have a low swell rate that can be bonded directly to the reservoir 30. Higher swell rate materials will function with the invention but may have a tendency to de-bond from the reservoir 30 or component to which they are attached.

A suitable membrane material would be a hydro-fused/non-asbestos gasket material such as ASTM-F723133E22M6 manufactured and sold by Interface Solutions, Inc. of Lancaster Pa. and sold as the M-5201 gasket. Other constructions use other materials such as cork, or fibrous paper-type gasket materials. The membrane is approximately one-eight of an inch thick with thinner and thicker membranes possible.

The material used for the membrane, the thickness of the membrane, and the surface area of the membrane are all variables that combine to determine the rate of flow through the membrane. Therefore, great variation in these properties is contemplated by the present invention depending on the specific application.

In the constructions illustrated in FIGS. 2–7 the membrane 115 is disposed within the reservoir 30 such that the additive must first pass through the membrane 115 to reach the aperture 105. In another construction, the membrane 115 is disposed outside of the reservoir 30. In this construction, the additive passes through the aperture 105 and is absorbed by the membrane 115. The membrane 115 then delivers the additive to the fuel tank 15 or container.

In yet another construction, the membrane 115 forms the bottom surface of the reservoir 110. In this construction, the membrane 115 alone separates the additive from the fuel and determines the rate of flow of additive to the fuel tank 15 or container.

Figure 12:
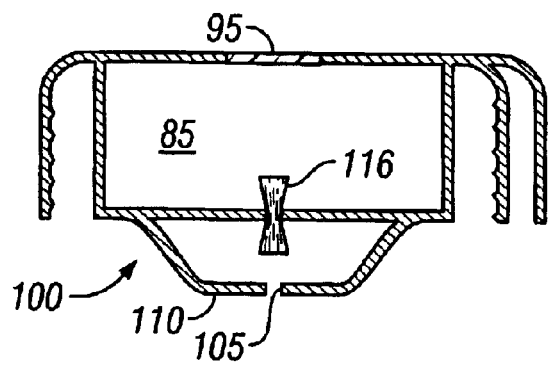
FIG. 12 is a cross-sectional view of an alternate construction of the release section of a drip feed apparatus.
Figure 13:
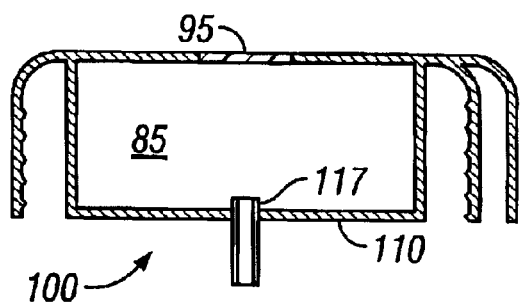
FIG. 13 is a cross-sectional view of another alternate construction of the release section of a drip feed apparatus.

Another construction of the release section 100, illustrated in FIG. 12, includes a wick 116 that extends into the chamber 85 rather than a membrane 115. The wick 116 utilizes capillary action in a known manner to deliver additive or additive dissolved in fuel from the chamber 85 to the fuel container or tank 15. While FIG. 12 illustrates a flexible wick 116, a capillary tube 117, as illustrated in FIG. 13, would also function to deliver additive to the tank 15 or container.

Figure 14:
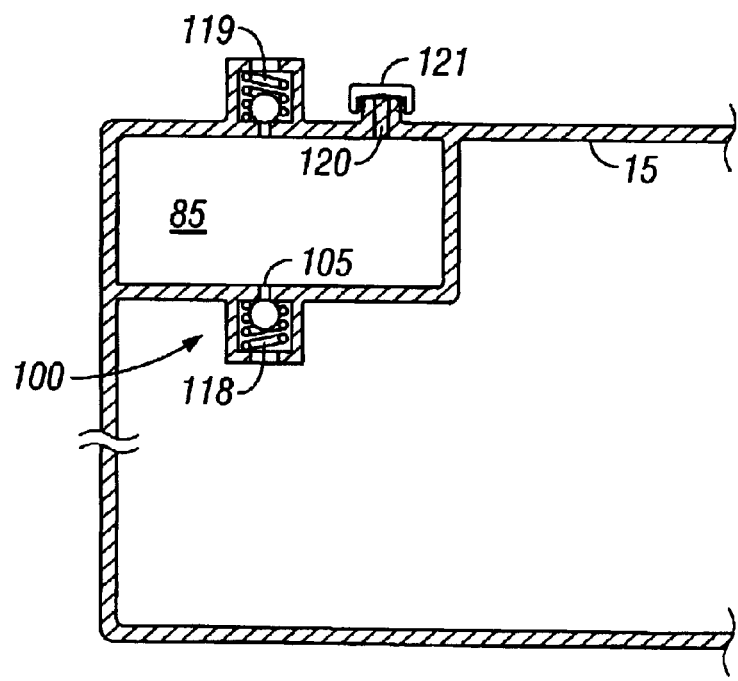
FIG. 14 is a cross-sectional view of an alternate construction of a drip feed apparatus.

In still another construction, illustrated in FIG. 14, the release section includes a check valve 118 that opens to deliver additive to the tank 15 or container. In this construction, the fuel tank 15 is vented to prevent pressurization or maintain the tank 15 at a pressure slightly above atmospheric pressure. The diurnal pressure fluctuations and temperature fluctuations of the atmosphere act to increase the pressure within the chamber 85, which is sealed. When the pressure reaches a predetermined differential (chamber pressure minus fuel tank pressure), the check valve 118 opens and additive is dispensed. The release of additive equalizes the pressure between the fuel tank 15 and the chamber 85, thereby allowing the check valve 118 to close. Because the diurnal effect is greatest during the hot summer months, a greater quantity of additive will be delivered during this period of time. In addition, a second check valve 119 may be used to deliver air to the chamber 85 to aid in equalizing the chamber pressure. Also illustrated in FIG. 14 is a fill hole 120 and cap 121 that allows for the refill of the chamber 85.

FIG. 2 best illustrates the window portion 95 of the reservoir 30. The window portion 95 is a clear portion that allows for the visual inspection of the chamber 85 within the reservoir 30. Thus, a user can visually determine whether fuel additive is present within the reservoir 30. In another construction, a portion of the sidewall of the reservoir 30 is transparent to allow the visual determination of the quantity of fuel additive within the reservoir 30.

Figure 5:
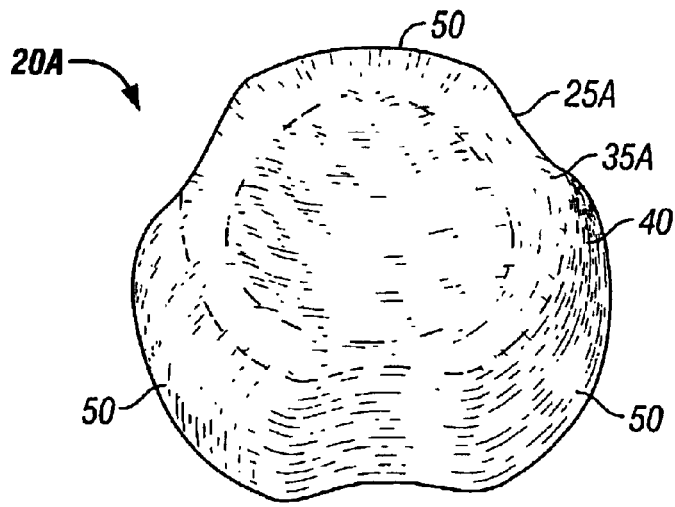
FIG. 5 is a first alternate construction of a cap embodying the invention.
Figure 6:
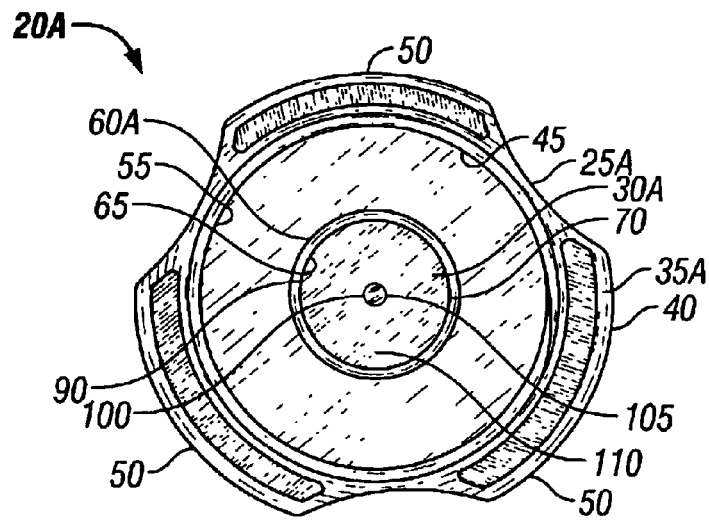
FIG. 6 is a bottom view of the cap shown in FIG. 5.
Figure 7:
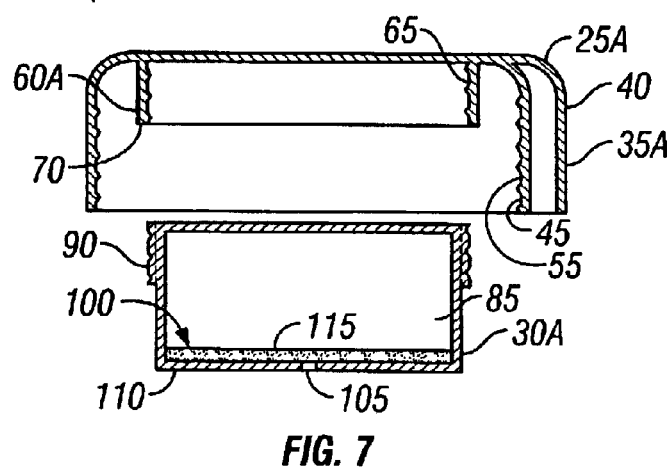
FIG. 7 is an exploded cross-sectional view of the cap of FIG. 5.

FIGS. 5–7 illustrate another construction of the cap 20A in which the cap shell 35A, or second housing, provides a sealing cover for the tank 15 or container opening. A receptacle 60A is disposed on the inside surface 45 of the cap shell 35A to support the reservoir 30A or first housing. The reservoir 30A in the construction of FIGS. 5–7 would not be visible to the user when the cap 20A is connected to the tank 15 or container.

The reservoir 30A, like the reservoir 30 of FIGS. 2–4, defines a fuel additive chamber 85. In preferred constructions, the fuel additive chamber 85 is large enough to hold about 8 ml of fluid with larger or smaller reservoirs possible depending on the application. For example, a chain saw may require a reservoir that only holds 4 ml of additive. On the other hand, a large fuel storage tank may require a reservoir as large as 1000 ml.

Figure 8:
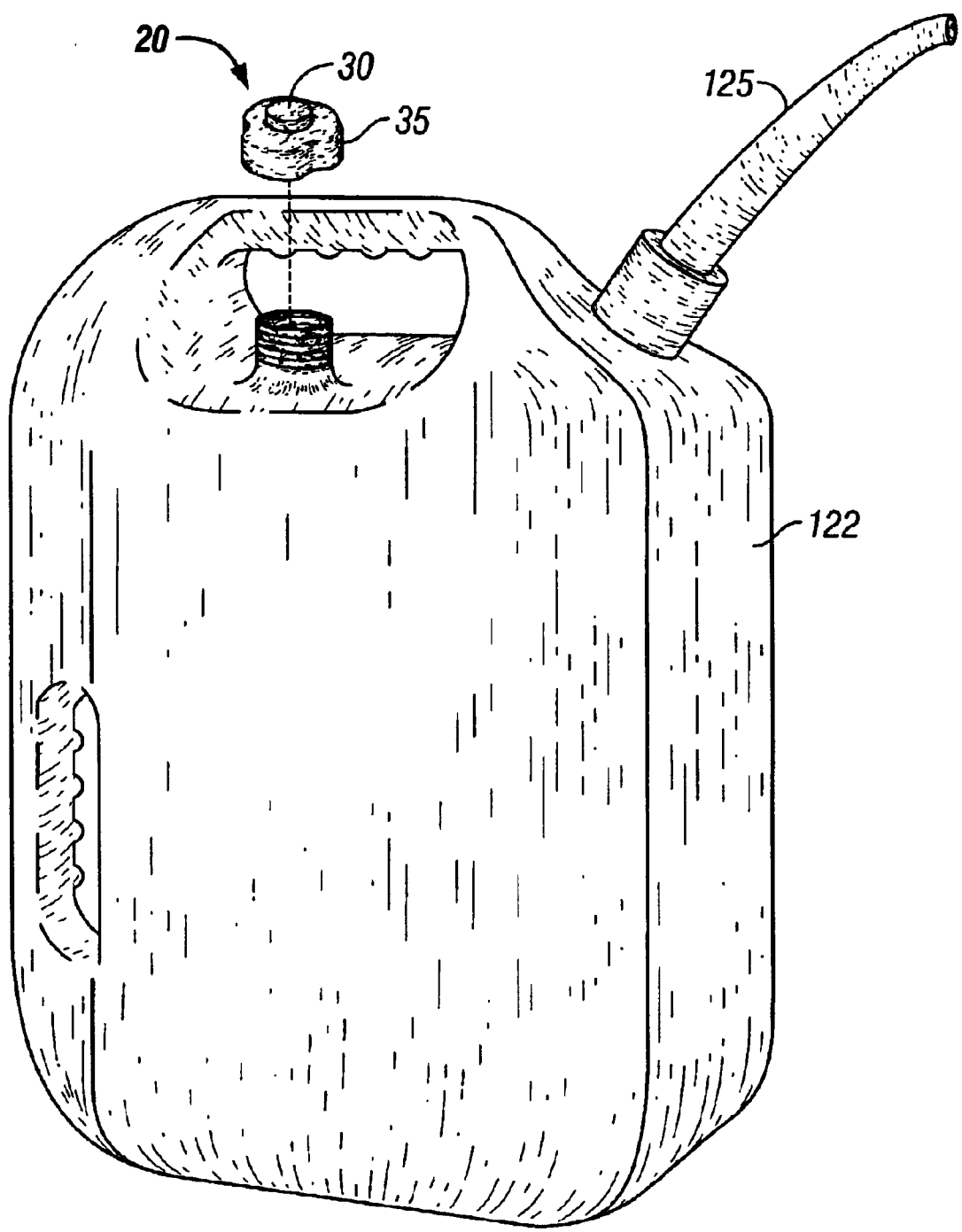
FIG. 8 is a partially exploded perspective view of a fuel container including the cap of FIG. 2.

FIG. 8 illustrates a fuel container 120 including a dispensing spout 125 and a cap 20 similar to the cap of FIGS. 1–4. The dispensing spout 125 covers a first opening through which fuel is added and removed. The cap 20 covers a second opening in the container 120. Thus, the cap 20 can be attached to the container 120 and only needs to be removed for replacement. Other cap designs, such as those illustrated in FIGS. 5–7 or in FIGS. 9–13 would also function as caps for the container 120 illustrated in FIG. 8.

In other constructions, the reservoir attaches to the inside of the container and is not visible from the outside. A receptacle within the tank or container receives the reservoir such that the container requires only one opening for filling the container and dispensing the fuel.

In still other constructions, the reservoir is formed as part of the container, as illustrated in FIG. 14. The reservoir within the container contains sufficient additive for a period of time (e.g., five years). When the additive runs out, the container is replaced or the reservoir is refilled.

Figure 9:
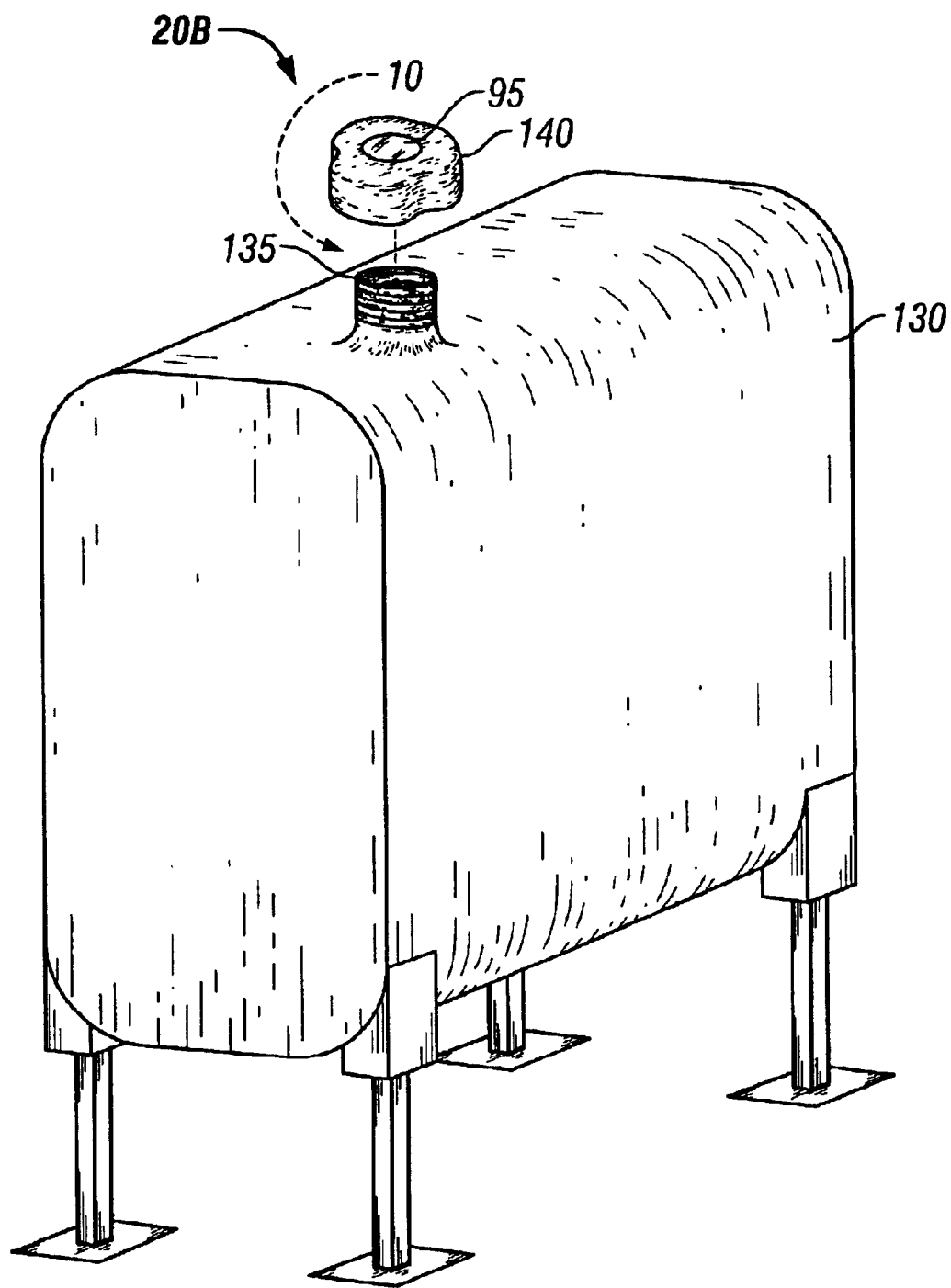
FIG. 9 is a perspective view of a fuel storage container and an alternate construction of the cap.

FIG. 9 illustrates a storage tank 130 commonly used on farms, construction sites, or other locations at which high quantities of fuel are used. A cap 20B is illustrated as covering an opening 135 in the tank 130. The cap 20B and opening 135 of FIG. 9 are exaggerated to better illustrate their location and design. Generally, these tanks 130 store dozens, or hundreds of gallons of fuel and as such are very large when compared to the fuel cap 20B.

Figure 10:
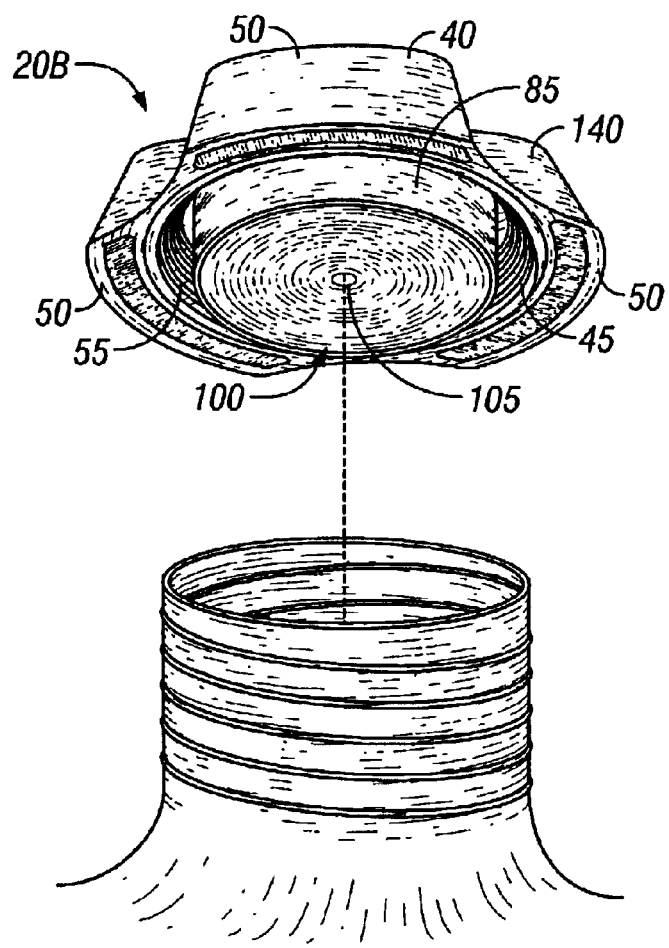
FIG. 10 is a partial perspective view of the fuel storage container of FIG. 9 including the cap of FIG. 9.

FIG. 10 better illustrates the interior of the cap 20B of FIG. 9. The cap 20B is formed from a single housing 140 that includes the reservoir and cap shell rather than the two piece cap 20A, 20B illustrated in FIGS. 1–7. Like previous constructions, the housing 140 defines the chamber 85, and includes a release section 100. The release section 100 includes an aperture 105 and a membrane 115 configured to dispense the additive at the desired rate.

Figure 11:
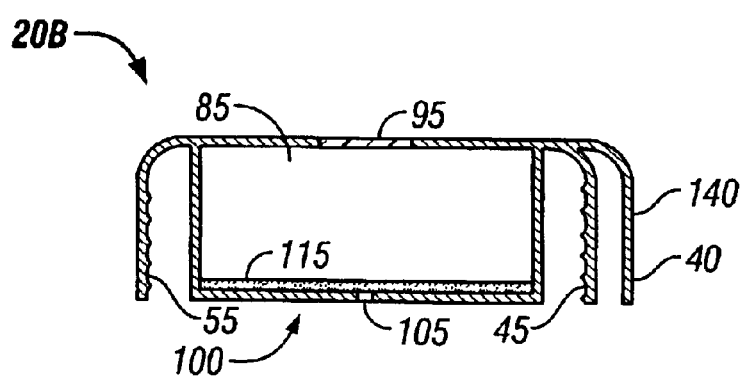
FIG. 11 is a cross-sectional view of the cap of FIG. 9.

The single piece cap 20B allows for a larger chamber 85, best illustrated in FIG. 11, than can be achieved using the two-piece construction. The larger chamber 85 allows the cap 20B to provide additive for a longer period of time, or alternatively allows for a faster drip rate. The faster drip rate may be necessary for the large volume of fuel commonly held in these large storage tanks 130.

As described above, the release section 100 of the reservoir 30, 30A or the one-piece cap 20B is designed to deliver the desired volume of fuel additive at the desired flow rate for the particular application in which it is being used. The desired drip rate is a function of many variables (e.g., fuel additive make-up, engine size, frequency of engine use, type of fuel, etc.). Continuing the chain saw example, a release section 100 that delivers a single drop of additive every three days may provide the desired protection to the chain saw engine. However, a large fuel storage container may require ten or more drops per day to properly treat the fuel.

Different drip rates or flow rates can be achieved by varying the design of the release section 100. For example, a very slow drip rate may be achieved by providing a small aperture 105 and a relatively thick membrane 115 in conjunction, while a fast drip rate may be achieved by providing a delivery mechanism including only a membrane 115. One having ordinary skill in the art will realize that any desired drip rate may be achieved with the present invention.

In preferred constructions, the housings of FIGS. 1–11 are made from high-density polyethelene (HDPE), with other materials being possible (e.g., composites, ceramics, metals, etc.). HDPE provides the strength and durability required while remaining easy to manufacture. Other materials, including metals, may be suitable for one or both of the housings. To further enhance the seal provided by the housings, fluorinated HDPE can be used. Fluorinated HDPE provides a vapor barrier that substantially reduces the rate of fuel vapor escape from the container or tank 15.

Many different fuel additives are available that can be dispensed by the invention. In addition, different mixtures of fuel additives can be employed. For example, a mixture of several different compounds including a multifunctional additive, an antioxidant, a corrosion inhibitor, and a metal deactivator may be desirable. One additive package includes a mixture comprising approximately 57% DMA-54HF, 36% AO-30, 3.5% DCI-6A and 3.5% DMD-2. DMA-54HF, AO-30, DCI-6A, and DMD-2 are trade designations for compounds sold by Octel Starreon, LLC of Littleton Colo. DMA-54HF is a composition of components commonly sold as a multifunctional additive for fuel. AO-30 is a composition of chemicals commonly sold as an antioxidant. DCI-6A is a chemical composition sold as a corrosion inhibitor, while DMD-2 is a chemical composition sold as a metal deactivator.

Other additives deliverable by the invention include solid additives. For example, Vanlube PCX is a solid crystalline anti-oxidant compound sold by R.T. Vanderbilt Company, Inc. of Norwalk Conn.

To deliver a solid fuel such as Vanlube PCX, a membrane 115 that absorbs fuel and vapors is used. The splashing within the tank or container combined with normal evaporation within the tank and condensation within the reservoir 85 wet the membrane. The crystals or powder within the reservoir 85 dissolve into the fuel absorbed by the membrane 115 and drip back into the tank. Thus, the apparatus of the invention is capable of delivering additive that is stored as a liquid or a solid.

The apparatus of the invention delivers additive to the fuel whether or not the fuel container is in use. If the fuel container is not used for a long period of time, the additive concentration within the container will increase. The higher concentration of additive enhances the protection provided by the additive during idle times. In addition, the higher concentration provides increased engine protection when the engine, powered by the fuel, is first started following an idle period.

As used herein, the terms fuel tank, fuel container, storage tank, etc. are interchangeable, as the invention will function with any vessel able to contain a fluid. As such, the invention should not be limited to the tanks or containers illustrated herein.

Although the invention has been described in detail with reference to certain preferred embodiments, variations and modifications exist within the scope and spirit of the invention as described and defined in the following claims.

What is claimed is:

1. An apparatus that provides a fuel additive to a fuel container adapted to contain a quantity of liquid fuel, the apparatus comprising:
a housing defining a fuel additive chamber, the housing being interconnectable to the container and the housing having a release section that automatically releases a portion of the fuel additive from said chamber such that the fuel additive drips into said container without human intervention or mechanical operation.

2. The apparatus of claim 1, wherein said release section includes an aperture.

3. The apparatus of claim 1, wherein said release section is disposed at a bottom of said housing.

4. The apparatus of claim 1, wherein said housing includes a connector that interconnects said housing to said container.

5. The apparatus of claim 1, further comprising a second housing interconnected between said first housing and said container, said second housing having a receptacle that receives said first housing.

6. The apparatus of claim 5, wherein said receptacle is disposed at a top of said second housing.

7. The apparatus of claim 6, wherein said receptacle is disposed at a bottom of said second housing.

8. The apparatus of claim 5, further comprising a first connector that connects said first housing to said second housing and a second connector that connects said second housing to said container.

9. The apparatus of claim 1, wherein said housing further comprises a window that enables visual inspection of the chamber.

10. The apparatus of claim 1, wherein the release portion is adapted to release a predetermined portion of the fuel additive at a predetermined time interval.

11. The apparatus of claim 1, wherein the release section releases additive at a first rate when exposed to a fuel vapor and a second rate when not exposed to the fuel vapor, the second rate being lower than the first rate.

12. An apparatus that provides a fuel additive to a fuel container adapted to contain a quantity of liquid fuel, the apparatus comprising:
a housing defining a fuel additive chamber, the housing being interconnectable to the container and the housing having a release section that automatically releases a portion of the fuel additive from said chamber into said container, wherein said release section includes a membrane that separates the fuel additive from the liquid fuel and that absorbs and releases the fuel additive.

13. The apparatus of claim 12, wherein said membrane is disposed inside said chamber.

14. The apparatus of claim 12, wherein said membrane is disposed on a bottom side of said housing.

15. The apparatus of claim 12, wherein the release section is arranged to allow the fuel additive to drip into the container.

16. The apparatus of claim 12, wherein the release section releases additive at a first rate when exposed to a fuel vapor and a second rate when not exposed to the fuel vapor, the second rate being lower than the first rate.

17. An apparatus that provides a fuel additive to a fuel container adapted to contain a quantity of liquid fuel, the apparatus comprising:
a housing defining a fuel additive chamber, the housing being interconnectable to the container and the housing having a release section that automatically releases a portion of the fuel additive from said chamber into said container, wherein said release section includes a membrane that absorbs and releases the fuel additive and an aperture in a bottom of said housing that allows the fuel additive to drip into the container.

18. The apparatus of claim 17, wherein the release section releases additive at a first rate when exposed to a fuel vapor and a second rate when not exposed to the fuel vapor, the second rate being lower than the first rate.

19. The apparatus of claim 17, wherein the membrane separates the fuel additive from the liquid fuel.

20. An an apparatus that provides a fuel additive to a fuel container, the apparatus comprising:
a housing defining a fuel additive chamber, the housing being interconnectable to the container and the housing having a release section that automatically releases a portion of the fuel additive from said chamber into said container without human intervention or mechanical operation; and
a second housing interconnected between said first housing and said container, said second housing having a receptacle that receives said first housing, wherein at least one of said first and second housings includes a fuel cap for said fuel container.

21. A cap that delivers a fuel additive to a fuel container, the cap comprising:
a first housing defining a fuel additive chamber, the housing having a release section that automatically releases a portion of the fuel additive from said chamber without human intervention or mechanical operation; and
a second housing selectively engagable with the container, the second housing supporting the first housing to position the release portion of the first housing in fluid communication with the container to allow the portion of fuel additive released from the chamber to enter the fuel container.

22. The cap of claim 21, wherein said release section includes an aperture.

23. The cap of claim 21, wherein said release section is disposed at a bottom of said first housing.

24. The cap of claim 21, wherein said second housing includes a connector that interconnects said second housing to said container.

25. The cap of claim 21, wherein said second housing includes a receptacle that receives said first housing.

26. The cap of claim 25, wherein said receptacle is disposed at a top of said second housing.

27. The cap of claim 25, wherein said receptacle is disposed at a bottom of said second housing.

28. The cap of claim 21, further comprising a first connector that connects said first housing to said second housing and a second connector that connects said second housing to said container.

29. The cap of claim 21, wherein said housing further comprises a window that enables visual inspection of the chamber.

30. The cap of claim 21, wherein the release portion is adapted to release a predetermined portion of the fuel additive at a predetermined time interval.

31. A cap that delivers a fuel additive to a fuel container, the cap comprising:
a first housing defining a fuel additive chamber, the housing having a release section that automatically releases a portion of the fuel additive from said chamber; and
a second housing selectively engagable with the container, the second housing supporting the first housing to position the release portion of the first housing in fluid communication with the container to allow the portion of fuel additive released from the chamber to enter the fuel container, wherein said release section includes a membrane that absorbs and releases the fuel additive.

32. The cap of claim 31, wherein said membrane is disposed inside said chamber.

33. The cap of claim 31, wherein said membrane is disposed on a bottom side of said first housing.

34. A cap that delivers a fuel additive to a fuel container, the cap comprising:
   a first housing defining a fuel additive chamber, the housing having a release section that automatically releases a portion of the fuel additive from said chamber; and
   a second housing selectively engagable with the container, the second housing supporting the first housing to position the release portion of the first housing in fluid communication with the container to allow the portion of fuel additive released from the chamber to enter the fuel container, wherein said release section includes a membrane that absorbs and releases the fuel additive and an aperture in a bottom of said housing.

35. A cap for a fuel container adapted to contain a quantity of liquid fuel, the cap comprising:
   a fuel additive;
   a first housing defining a fuel additive chamber, the fuel additive contained within the fuel additive chamber, the housing having a release section that automatically releases a portion of the fuel additive from said chamber;
   a second housing interconnected with the container, the second housing supporting the first housing to position the release portion of the first housing in fluid communication with the container to allow the portion of fuel additive released from the chamber to enter the fuel container; and
   a membrane disposed within the release section, the membrane absorbing and releasing fuel additive at a predetermined rate to allow the fuel additive to drip into the fuel container.

36. The cap of claim 35, wherein said release section includes an aperture.

37. The cap of claim 35, wherein said membrane is disposed inside said fuel additive chamber.

38. The cap of claim 35, wherein said membrane is disposed on a bottom side of said first housing.

39. The cap of claim 35, wherein said release section is disposed at the bottom of said first housing.

40. The cap of claim 35, wherein said second housing includes a receptacle that receives said first housing.

41. The cap of claim 40, wherein said receptacle is disposed at a top of said second housing.

42. The cap of claim 40, wherein said receptacle is disposed at a bottom of said second housing.

43. The cap of claim 35, wherein said housing further comprises a window that enables visual inspection of the chamber.

44. The cap of claim 35, wherein the release portion is adapted to release a predetermined portion of the fuel additive at a predetermined time interval.

45. The apparatus of claim 35, wherein the release section releases additive at a first rate when exposed to a fuel vapor and a second rate when not exposed to the fuel vapor, the second rate being lower than the first rate.

46. The apparatus of claim 35, wherein the membrane separates the fuel additive from the liquid fuel.

* * * * *